United States Patent
Katzman et al.

(10) Patent No.: US 6,786,600 B2
(45) Date of Patent: Sep. 7, 2004

(54) METHODS FOR GENERATING A PROGRESSIVE SURFACE AND FOR PRODUCTION OF MULTIFOCAL PROGRESSIVE LENSES

(75) Inventors: Dan Katzman, Givat Ela (IL); Yuval Carmon, Tivon (IL)

(73) Assignee: Shamir Optical Industry, Upper Galilee (IL)

( * ) Notice: Subject to any disclaimer, the term of this patent is extended or adjusted under 35 U.S.C. 154(b) by 0 days.

(21) Appl. No.: 10/135,837

(22) Filed: May 1, 2002

(65) Prior Publication Data

US 2003/0206270 A1 Nov. 6, 2003

(51) Int. Cl.[7] .............................................. G02C 7/06
(52) U.S. Cl. ........................................ 351/177; 351/169
(58) Field of Search ................................... 351/169, 177

(56) References Cited

U.S. PATENT DOCUMENTS

| 2,878,721 | A | | 3/1959 | Kanolt |
| 3,711,191 | A | | 1/1973 | Tagnon |
| 5,042,936 | A | * | 8/1991 | Guilino et al. ............... 351/169 |
| 6,019,470 | A | | 2/2000 | Mukaiyama et al. |
| 6,089,713 | A | | 7/2000 | Hof et al. |
| 6,116,734 | A | * | 9/2000 | Pedrono et al. ............. 351/159 |
| 6,302,540 | B1 | | 10/2001 | Katzman et al. |

* cited by examiner

Primary Examiner—Scott J. Sugarman
(74) Attorney, Agent, or Firm—Eitan, Pearl, Latzer & Cohen Zedek, LLP (57) ABSTRACT

A method for generating a progressive surface includes generating the surface from stored delta data and a substantially spherical surface calculated on-the-fly.

10 Claims, 7 Drawing Sheets

METHODS FOR GENERATING A PROGRESSIVE SURFACE AND FOR PRODUCTION OF MULTIFOCAL PROGRESSIVE LENSES

BACKGROUND OF THE INVENTION

Progressive multifocal lenses typically comprise a far-vision region having one refractive power, a near-vision region having a different refractive power, and an intermediate progressive region.

In a common method for producing progressive multifocal lenses, a semi-finished lens blank having suitable optical characteristics is selected based on a prescription. Typically the semi-finished progressive lens blank comprises a front progressive multifocal surface and a back spherical surface. The back surface of the semi-finished lens blank is then machined and polished to match the prescription. Unfortunately, current semi-finished progressive lens blanks are relatively expensive.

An alternative method for producing multifocal progressive lenses uses less expensive single vision semi-finished lens blanks having a front spherical surface and a back spherical surface. Based on the prescription, a single vision semi-finished lens blank having a suitable optical power is selected. A progressive surface design is then computed in accordance with the prescription, and the back surface of the lens blank is machined and polished to produce the desired progressive surface. Although less expensive, this method for producing multifocal progressive lenses is relatively time consuming, partly due to the computational complexity of computing the progressive surface for each prescription.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods and procedures have not been described in detail so as not to obscure the present invention.

Unless specifically stated otherwise, as apparent from the following discussions, it is appreciated that throughout the specification discussions utilizing terms such as "computing", "calculating" "generating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

Although the scope of the present invention is not limited in this respect, for the sake of clarity, the following description describes lenses for spectacles. However, it would be obvious to those with ordinary skills in the art how to modify the methods described hereinbelow to design other vision-correcting elements such as contact lenses, intraocular lenses, and the like. It would also be obvious to those with ordinary skills in the art how to use the methods described hereinbelow to design the shape of corneal tissue.

Throughout the specification and the claims, the phrase "substantially spherical surface" is used to mean a spherical surface, a toric surface or an aspherical surface that is nearly spherical.

Although the scope of the present invention is not limited in this respect, for the sake of clarity, the following description describes lenses having a substantially spherical front surface and a progressive back surface. It would also be obvious to those with ordinary skills in the art how to modify the methods described hereinbelow for lenses having a progressive front surface and a substantially spherical back surface.

Some embodiments of the present invention are directed to methods for generating a progressive surface from a substantially spherical surface calculated on-the-fly and stored delta data. The back surface of a single vision semi-finished lens blank having a substantially spherical front surface may then be machined according to the generated progressive surface.

Figure 1:
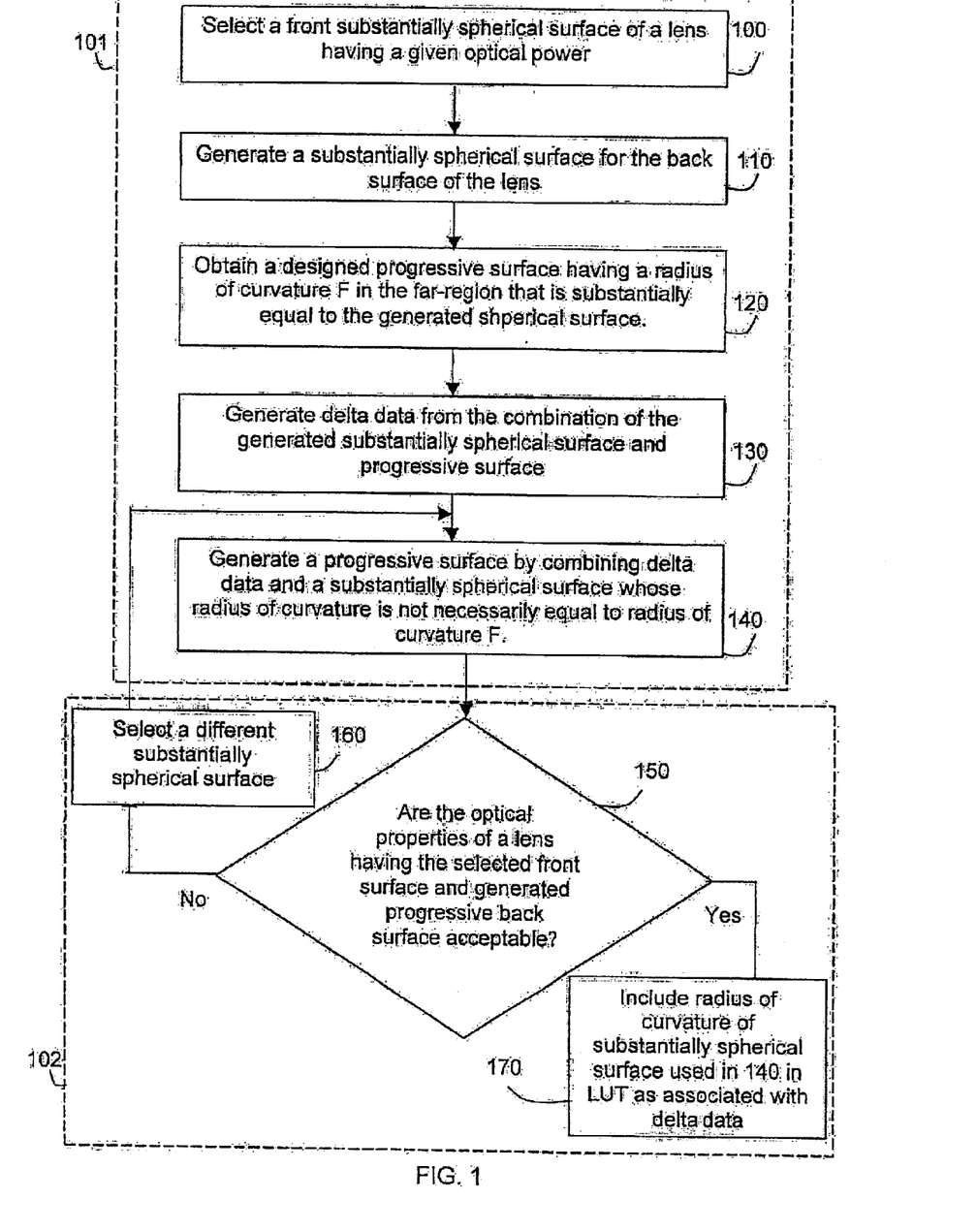
FIG. 1 is a flowchart illustration of a method for generating delta data and identifying a range of radius of curvature values associated with the delta data, according to some embodiments of the present invention.
Figure 2:
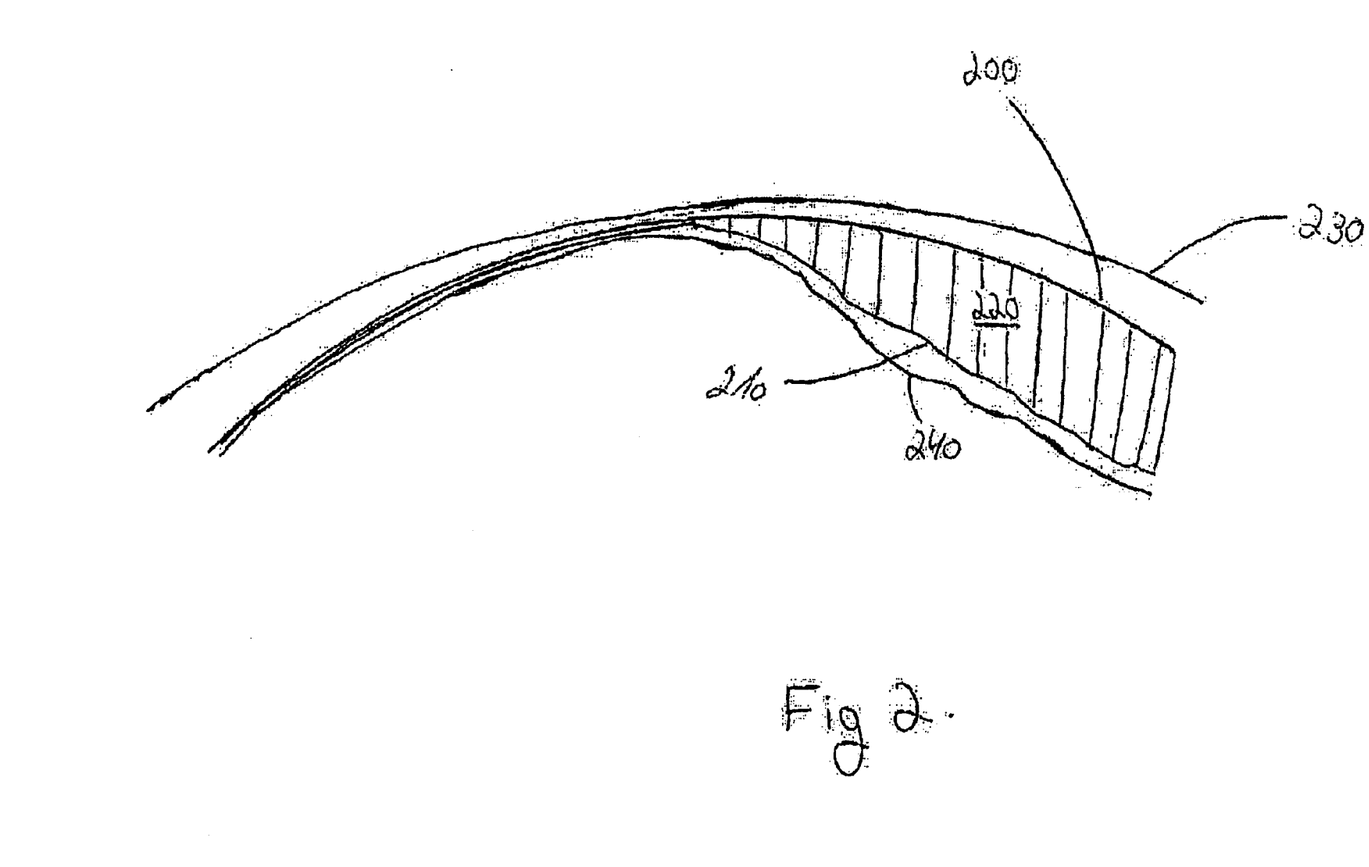
FIG. 2 is an illustration of surface cross-sections, helpful in understanding some embodiments of the present invention.

Reference is now made to FIG. 1, which is a flowchart illustration of a method for generating delta data (block 101 and identifying a range of radius of curvature values associated with the delta data (block 102), according to some embodiments of the present invention. Reference is made additionally to FIG. 2, which is an illustration of surface cross-sections, and to FIGS. 5, 6 and 7, which are graphical illustrations of surfaces, helpful in understanding some embodiments of the present invention. Given a desired optical power, an appropriate radius of curvature of a front substantially spherical surface of a lens may be selected by a human or automatically using known means (block 100). Using any known or yet to be devised method a substantially spherical surface 200 or the back surface of the lens may be generated (block 110), the substantially spherical surface 200 having a radius of curvature F that, in combination with the selected front surface and the lens index of refraction, would result in a lens having the desired optical power if the lens were a single vision lens.

Figure 5:
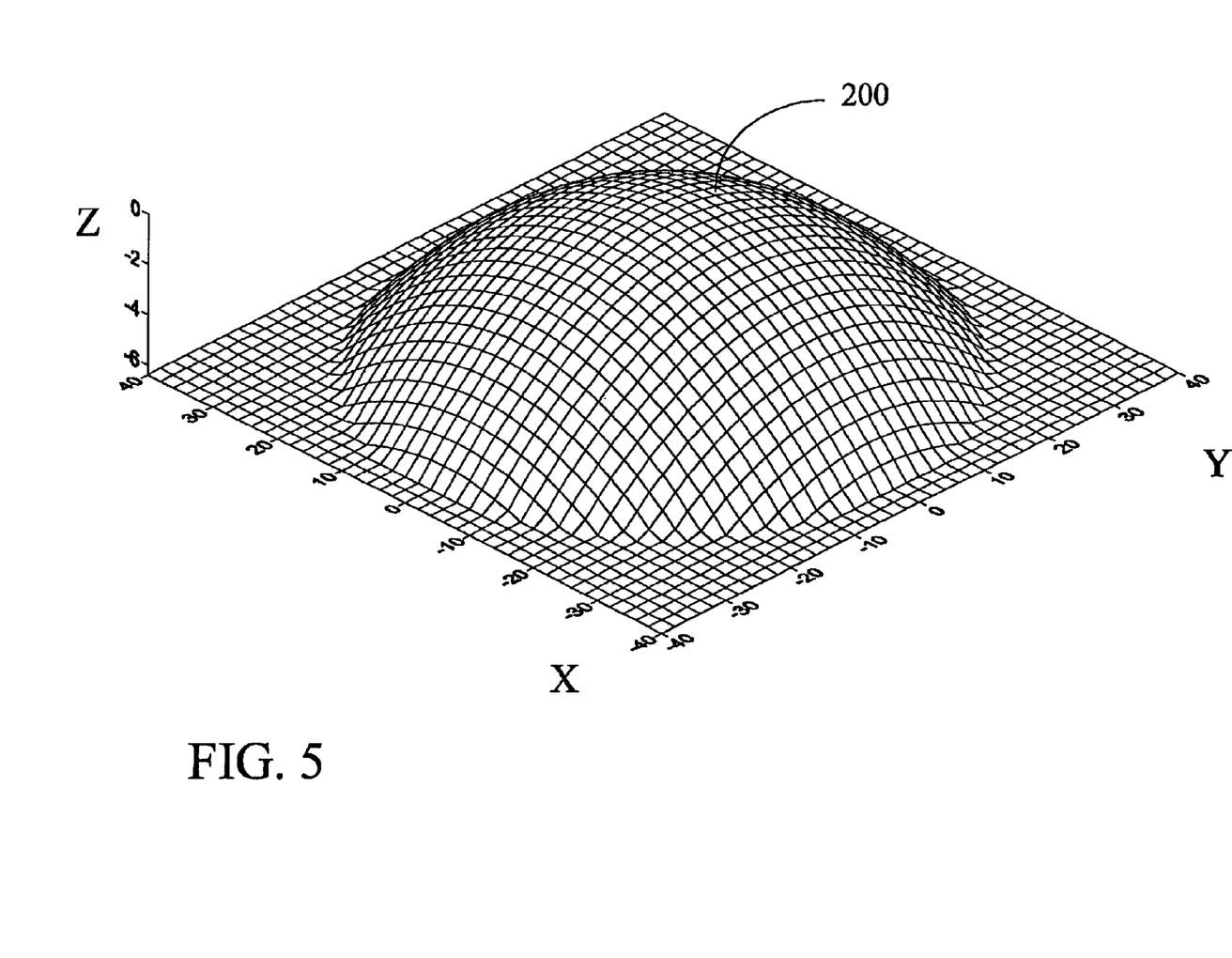
FIG. 5 is a graphical illustration of a spherical surface.
Figure 6:
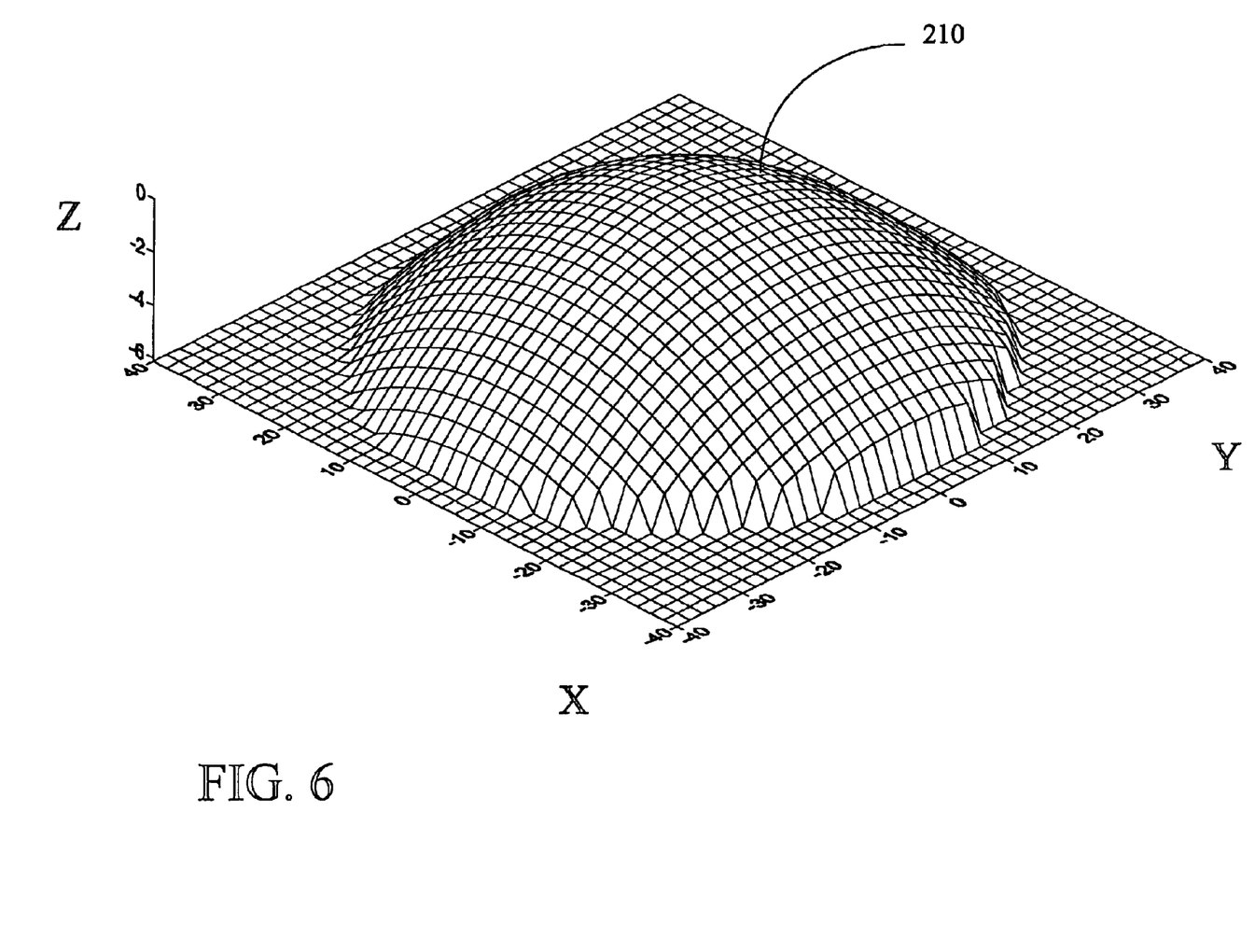
FIG. 6 is a graphical illustration of a designed progressive surface.
Figure 7:
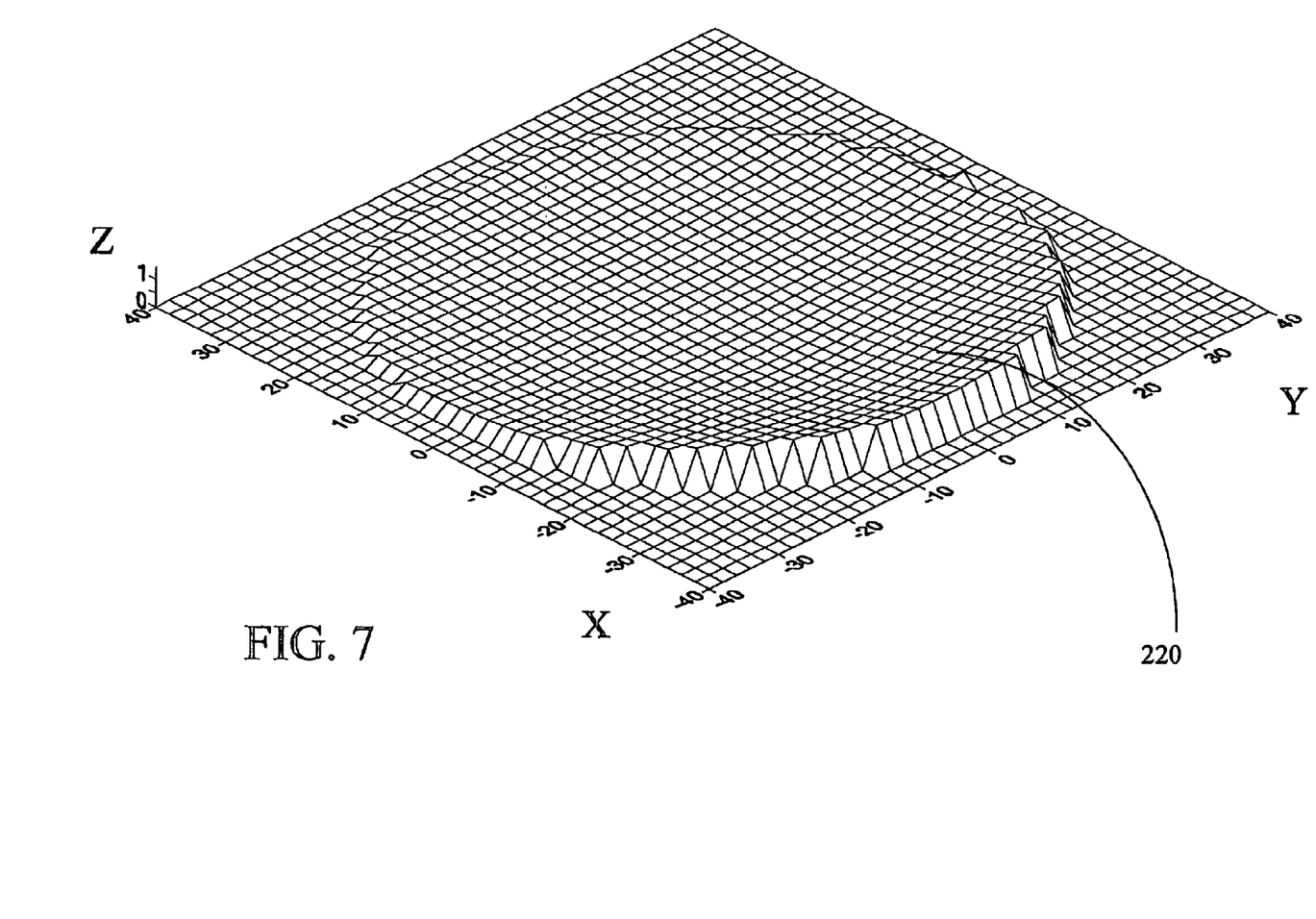
FIG. 7 is a graphical illustration of a difference surface.

A designed progressive surface 210 with a radius of curvature F in its far vision region and a desired addition A may be obtained (block 120). Any known or yet to be devised method for designing a progressive surface may be used to calculate the progressive surface 210, for example, the design method disclosed in U.S. Pat. No. 6,302,540 to Katzman et al. It will be appreciated by persons of ordinary skill in the art that different indices of refraction for the lens will result in different progressive surfaces calculated by a specific design method, all other factors being equal. Delta data 220 may be generated by combining substantially spherical surface 200 and progressive surface 210 (block 130). Delta data 220 may then be stored on a suitable storage medium. Although the scope of the present invention is not limited in this respect, delta data 220 may be generated by calculating the difference between progressive surface 210 and substantially spherical surface 200. If, for example, the vertical axis in FIGS. 5, 6 and 7 is the z-axis and the reference plane (i.e. the grid) is the x-y plane. $S_{PROG1}(x\text{-}y)$ represents the height (z-value) of designed progressive surface 210 relative to x-y plane at the point (x,y), and $S_{SPH1}(x,y)$, represents the height (z-value) of substantially spherical surface 200 relative to the x-y plane at the point (x,y), the following equation for D(x,y) represents the height (z-value) of the difference surface 220, or delta data, relative to the x-y plane at the point (x,y):

$$D(x,y)=S_{PROG1}(x,y)-S_{SPH1}(x,y). \quad \text{(Eq. 1)}$$

Alternatively, delta data 220 may be generated by calculating the difference between substantially spherical surface 200 and progressive surface 210, as represented by the following equation:

$$D(x,y)=S_{SPH1}(x,y)-S_{PROG1}(x,y). \quad \text{(Eq. 2)}$$

Alternatively, other methods of combining substantially spherical surface 200 and progressive surface 210 may be used to generate delta data 220. As indicated by the vertical lines in FIG. 2. delta data 220 may be a set of discrete difference data.

It will be appreciated by persons of ordinary skill in the art that the method described in block 102 may be modified. For example, the starting point may be progressive surface 210. Substantially spherical surface 200 may be generated using known or yet to be devised methods to have a radius of curvature F substantially equal to the radius of curvature of the far-vision region of progressive surface 210. An appropriate radius of curvature of a front substantially spherical surface may be identified, given a desired optical power for a lens having a substantially spherical back surface 200.

Once delta data 220 has been generated (and stored), it is possible to identify a range of radius of curvature values to be associated with delta data 220 (block 102). A substantially spherical surface 230 whose radius of curvature is not necessarily equal to F may be generated using known or yet to be devised methods (block 140). A progressive surface 240 may then be generated by combining delta data 220 and substantially spherical surface 230 (block 140). For example, the radius of curvature F of the far-vision region of the calculated progressive surface used to generate delta data 220 may be on the order of 100 mm, and the radius of curvature of substantially spherical surface 230 used in block 140 to generate progressive surface 240 may be on the order of 102 mm.

For example, if delta data 220 was generated using Eq. 1 above, then progressive surface 240 may be generated by adding delta data 220 to substantially spherical surface 230. If, for example, $S_{SPH2}(x,y)$ represents the height (z-value) of substantially spherical surface 230 and, then the following equation for $S_{PROG2}(x,y)$ represents the height (z-value) of generated progressive surface 24):

$$S_{PROG2}(x,y)=D(x,y)+S_{SPH2}(x,y). \quad \text{(Eq. 3)}$$

Alternatively, if delta data 220 was generated using Eq. 2 above, then progressive surface 240 may be generated by subtracting delta data 220 from substantially spherical surface 230. In that case, the following equation for $S_{PROG2}(x,y)$ represents the height (z-value) of generated progressive surface 240:

$$S_{SPROG2}(x,y)=S_{SPH2}(x,y)-D(x,y). \quad \text{(Eq. 4)}$$

The optical properties of a lens having the substantially spherical front surface selected in block 100 and generated progressive back surface 240 may then be evaluated to see whether the lens is compatible with the performance suggested by the design used to calculate the original progressive surface 210 from which delta data 220 was generated (block 150). If the optical properties of the lens are acceptable, the radius of curvature of substantially spherical surface 230 used in block 140 may be included in a look-up table as associated with delta data 220 (block 170). If it is determined that the optical properties of the lens are not acceptable, block 140 may be repeated using a different substantially spherical surface (block 160).

The method of FIG. 1 may be repeated for different parameters, such as, for example, different desired optical powers, different desired additions, different design methods (for calculating the original progressive surface 210), different indices of refraction for the material from which the lens will be produced (this information is used in the design method and in the determination of the appropriate radii of curvature of the front and back substantially spherical surfaces for a single-vision lens with the desired optical power).

It will be appreciated by persons of ordinary skill in the art that block 101 and block 102 need not be performed consecutively for a given parameter configuration. Rather, block 101 may be repeated for different parameter configurations, each repeat of block 101 resulting in delta data, and then block 102 may be performed on each of the delta data in turn.

It will also be appreciated by persons of ordinary skill in the art that the look-up table may associate each delta data with the parameters used in block 101 when generating that particular delta data. For example, each delta data may be associated with the desired optical power, the desired addition, the design method used to calculate the original progressive surface from which the delta data was generated, the index of refraction of the lens, and a range of radius of curvature of a substantially spherical back surface which may be combined with the delta data to generate a progressive surface. Although the scope of the present invention is not limited in this respect, the look-up table may include a pointer to the location of the delta data in the storage medium rather than the delta data itself. It will be appreciated by persons of ordinary skill in the art that several look-up tables may be used instead of a single look-up table.

Figure 3:
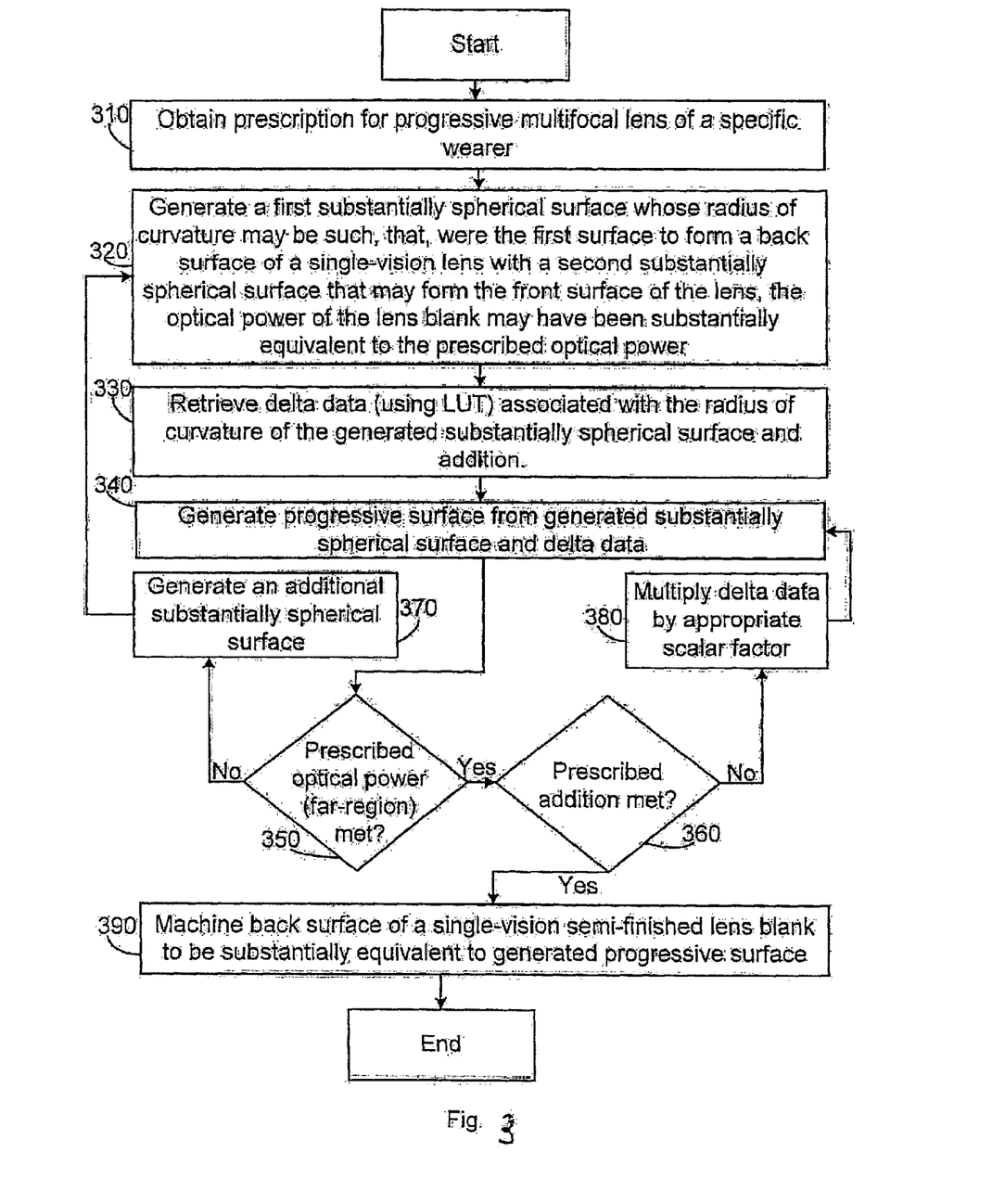
FIG. 3 is a flowchart illustration of a method for producing a multifocal progressive lens, according to some embodiments of the present invention.
Figure 4:
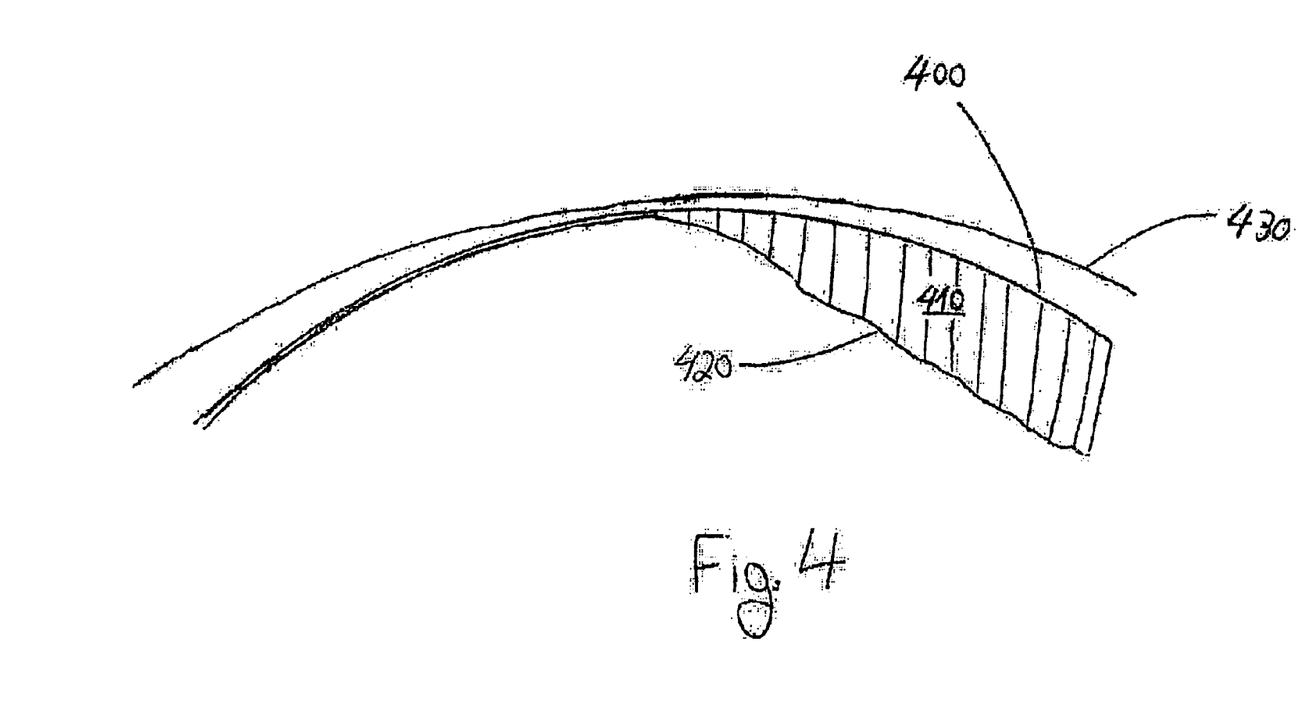
FIG. 4 is an illustration of surface cross-sections helpful in understanding some embodiments of the present invention.

Reference is now made to FIG. 3, which is a flowchart illustration of a method for producing a multifocal (progressive) lens, according to some embodiments of the present invention. Reference is made additionally to FIG. 4, which is an illustration of surface cross-sections, helpful in understanding some embodiments of the present invention. Initially a prescription for a multifocal (progressive) lens of a specific wearer may be obtained, the prescription specifying the optical power and the addition A of the lens (block 310).

A first substantially spherical surface may be generated 400. The radius of curvature of the first substantially spherical surface 400 may be such that were the first surface 400 to form a back surface of a single-vision lens with a second substantially spherical surface that may form the front surface of the single-vision lens, the single-vision lens may have an optical power substantially equivalent to the prescribed optical power (block 320).

A delta data 410 associated with the radius of curvature of the generated spherical surface 400 and the prescribed addition may be retrieved (block 330). For example, a delta look-up table may be consulted to select a stored delta data associated with the radius of curvature of the generated spherical surface and the prescribed addition. A progressive surface 420 may then be generated by combining the delta data 410 and the generated substantially spherical surface 400 (block 340).

For example, if delta 410 was generated using Eq. 1 above, then progressive surface 420 may be generated by adding delta data 410 to substantially spherical surface 400. If, for example, $S_{SPH3}(x,y)$ represents the height (z-value) of substantially spherical surface 400 and, then the following equation for $S_{PROG3}(x,y)$ represents the height (z-value) of generated progressive surface 420:

$$S_{PROG3}(x,y) = D(x,y) + S_{SPH3}(x,y). \qquad \text{(Eq. 5)}$$

Alternatively, if delta data 410 was generated using Eq. 2 above, then progressive surface 420 may be generated by subtracting delta data 410 from substantially spherical surface 400. In that case, the following equation for $S_{PROG3}(x,y)$ represents the height (z-value) of generated progressive surface 420:

$$S_{PROG3}(x,y) = S_{SPH3}(x,y) - D(x,y). \qquad \text{(Eq. 6)}$$

The optical power that may be provided by a lens formed by the generated progressive surface 420 and the first substantially spherical 400 surface may be evaluated to see whether the optical power suggested by such a lens is substantially equivalent with prescribed optical power (block 350). If it is determined that the optical power suggested by such a lens is not acceptable, an additional substantially spherical surface 430 may be generated. The radius of curvature of the additional substantially spherical surface 430 may be such that were the additional surface 430 to form a back surface of a single-vision lens with the second substantially spherical surface that may form the front surface of the single-vision lens, the single-vision lens may have an optical power substantially equivalent to the prescribed optical power (block 370). Steps 320–350 may be repeated with the additional generated spherical surface 430.

If it is determined that the optical power suggested by such a lens is acceptable (block 350), the addition that may be provided by a lens formed by the generated progressive surface 420 and the generated substantially spherical surface 400 or 430 may be evaluated to see whether the addition suggested by such a lens is substantially equivalent with the prescribed addition (block 360).

If it is determined that the addition suggested by such a lens is not acceptable the delta data 410 used in block 340 to generate the progressive surface 420 may be modified (block 380). For example, the delta data 410 may be modified by multiplying the delta data by a scalar factor. Steps 340–360 may be repeated with the modified delta data 440.

If it is determined that the addition suggested by such a lens is acceptable (block 360), the back surface of a single-vision semi finished lens blank may be machined to be substantially equivalent the generated progressive surface (block 390).

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method comprising:
   subtracting a designed multifocal progressive surface from a substantially spherical surface to obtain a set of difference data; and
   determining a range of radii of curvature values to associate with said set of difference data.

2. The method of claim 1, wherein determining said range of radii of curvature values comprises:
   subtracting said set of difference data from an additional substantially spherical surface having a particular radius of curvature to produce a generated multifocal progressive surface;
   determining whether optical properties of a lens having said generated multifocal progressive surface meet predetermined criteria; and
   if said optical properties meet said predetermined criteria, including said particular radius of curvature in said range.

3. A method comprising:
   subtracting a substantially spherical surface from a designed multifocal progressive surface to obtain a set of difference data; and
   determining a range of radii of curvature values to associate with said set of difference data.

4. The method of claim 3, wherein determining said range of radii of curvature values comprises:

adding said set of difference data to an additional substantially spherical surface having a particular radius of curvature to produce a generated multifocal progressive surface;

determining whether optical properties of a lens having said generated multifocal progressive surface meet predetermined criteria; and if said optical properties meet said predetermined criteria, including said particular radius of curvature in said range.

5. A method comprising:

obtaining a prescription or a multifocal progressive lens, said prescription including a prescribed optical power of a far-vision region of said multifocal progressive lens and a prescribed addition;

generating a first substantially spherical surface whose radius of curvature is such that were said first substantially spherical surface to form a single-vision lens with a second substantially spherical surface, said single-vision lens would have an optical power substantially equivalent of said prescribed optical power;

identifying a set of difference data associated with said radius of curvature and said prescribed addition; and generating a multifocal progressive surface by combining said set of difference data and said first substantially spherical surface.

6. The method of claim 5, further comprising:

machining a back surface of a semi-finished lens blank having said second substantially spherical surface as its front surface to be substantially equivalent to said generated multifocal progressive surface.

7. The method of claim 5, further comprising:

upon determining that the optical power of a far-vision region of a multifocal progressive lens formed by said generated multifocal progressive surface and said second substantially spherical surface would not be substantially equivalent to said prescribed optical power:

generating a third substantially spherical surface whose radius of curvature is such that were said third substantially spherical surface to form a single-vision lens with said second substantially spherical surface, said single-vision lens would have an optical power substantially equivalent to said prescribed optical power; and generating another progressive surface by combining said set of difference data and said substantially spherical surface.

8. The method of claim 5, further comprising:

upon determining that an addition of a lens formed by said generated multifocal progressive surface and said second substantially spherical surface would not be substantially equivalent to said prescribed addition:

modifying said set of difference data by multiplying said set of difference data by a scalar factor; and generating another multifocal progressive surface by combining said modified set of difference data and said first substantially spherical surface.

9. The method of claim 5, wherein combining said set of difference data and said first substantially spherical surface comprises adding said set of difference data to said first substantially spherical surface.

10. The method of claim 5, wherein combining said set of difference data and said first substantially spherical surface comprises subtracting said set of difference data from said first substantially spherical surface.

* * * * *